United States Patent
Carswell et al.

(10) Patent No.: US 10,718,863 B2
(45) Date of Patent: Jul. 21, 2020

(54) MOBILE RADAR FOR VISUALIZING TOPOGRAPHY

(71) Applicant: Remote Sensing Solutions, Inc., Barnstable, MA (US)

(72) Inventors: James R. Carswell, Yarmouthport, MA (US); Delwyn Karen Moller, Sierra Madre, CA (US)

(73) Assignee: Remote Sensing Solutions, Inc., Barnstable, MA (US)

(*) Notice: Subject to any disclaimer, the term of this patent is extended or adjusted under 35 U.S.C. 154(b) by 217 days.

(21) Appl. No.: 15/657,056

(22) Filed: Jul. 21, 2017

(65) Prior Publication Data

US 2018/0031695 A1 Feb. 1, 2018

Related U.S. Application Data

(60) Provisional application No. 62/368,203, filed on Jul. 29, 2016.

(51) Int. Cl.
| | |
|---|---|
| *G01S 13/90* | (2006.01) |
| *G01S 13/93* | (2020.01) |
| *G01S 13/44* | (2006.01) |
| *G01S 13/89* | (2006.01) |
| *G01S 13/42* | (2006.01) |
| *G01S 13/935* | (2020.01) |
| *H01Q 3/38* | (2006.01) |
| *G01S 13/02* | (2006.01) |

(52) U.S. Cl.
CPC .......... *G01S 13/9023* (2013.01); *G01S 13/42* (2013.01); *G01S 13/4454* (2013.01); *G01S 13/89* (2013.01); *G01S 13/93* (2013.01); *G01S 13/935* (2020.01); *H01Q 3/38* (2013.01); *G01S 2013/0254* (2013.01)

(58) Field of Classification Search
CPC ...... G01S 15/8902; G01S 15/89; G01S 7/521; G01S 7/6245; G01S 7/526; G01S 15/876; G01S 7/54; G01S 17/89; G01S 17/936; G01S 13/89; G01S 13/9023; G01S 13/904; G01S 17/895; G01S 7/4863; G01S 13/9064; G01S 13/90; G01S 15/8993; G01S 3/043; G01S 13/935; G01S 13/42; G01S 13/4454; G01S 13/93; G01S 2013/0254; H01Q 3/38
See application file for complete search history.

(56) References Cited

U.S. PATENT DOCUMENTS

| | | | |
|---|---|---|---|
| 5,999,893 A * | 12/1999 | Lynch, Jr. ............ | G06K 9/6217 700/30 |
| 6,023,235 A | 2/2000 | Sauer | |
| 6,246,365 B1 * | 6/2001 | Tokoro .................... | G01S 13/42 342/149 |
| 9,188,670 B2 * | 11/2015 | Bruyere .............. | G01S 13/9023 |
| 10,168,420 B1 * | 1/2019 | Fluhler ................. | G01S 13/003 |
| 2008/0012751 A1* | 1/2008 | Owens .................... | F41G 7/226 342/62 |
| 2008/0036648 A1 | 2/2008 | Green et al. | |

(Continued)

*Primary Examiner* — Olumide Ajibade Akonai
(74) *Attorney, Agent, or Firm* — Barlow, Josephs & Holmes, Ltd.

(57) ABSTRACT

A mobile radar system for visualizing forward looking topography is configured with at least two phased-array antennas to form a forwarding looking phased-array interferometer.

11 Claims, 10 Drawing Sheets

(56) References Cited

U.S. PATENT DOCUMENTS

| | | | | |
|---|---|---|---|---|
| 2009/0103593 A1* | 4/2009 | Bergamo | ............... | H04B 1/707 375/146 |
| 2010/0045513 A1* | 2/2010 | Pett | ......................... | G01S 7/295 342/25 C |
| 2016/0341827 A1* | 11/2016 | Homer | ................... | G01S 7/6245 |
| 2016/0377716 A1* | 12/2016 | Proctor | ................... | G01S 15/89 367/88 |

* cited by examiner

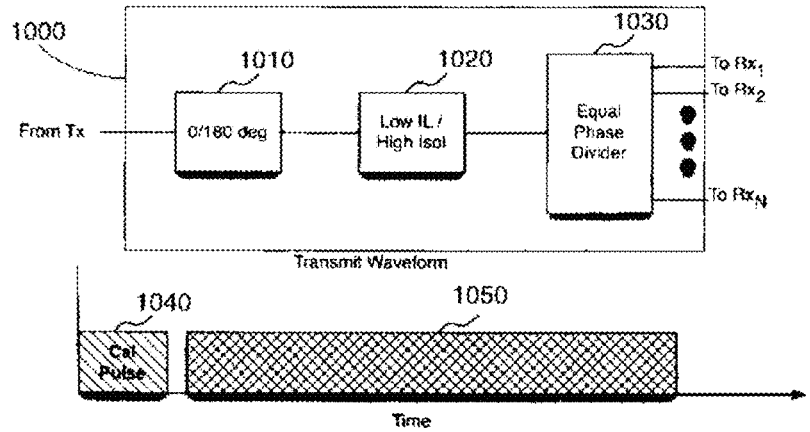
FIG. 10
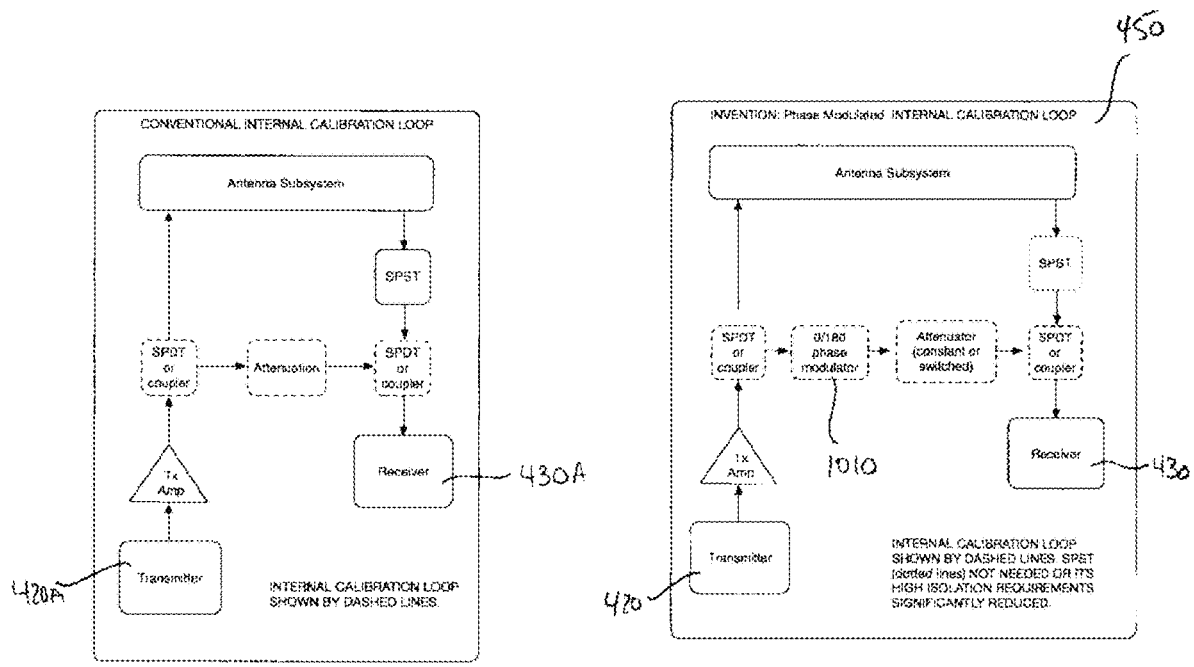
FIG. 10A
*(prior art)*
FIG. 10B

MOBILE RADAR FOR VISUALIZING TOPOGRAPHY

CROSS-REFERENCE TO RELATED APPLICATIONS

This application claims the benefit of U.S. Provisional Patent Application No. 62/368,203, filed Jul. 29, 2016, the entire contents of which are incorporated herein by reference.

BACKGROUND OF THE INVENTION

(1) Field of the Invention

The invention relates to navigation, and in particular, to the two and three dimensional visualization of man-made, terrestrial, and marine scene topography in clear or degraded visual environmental conditions and verification of platform position in global positioning system (GPS) compromised conditions for use in manned and unmanned aviation, marine navigation on waterways and water bodies, navigation of autonomous systems, and navigation of other mobile platforms.

(2) Background

An operator of a mobile platform, manned or unmanned, requires real-time knowledge of the scene topography for safe navigation. Natural vision is often the primary source for this information. However in degraded visual conditions, scene topography must be monitored through other means. In aviation, the operator (i.e. a pilot) is required to visualize the flight path scene topography (natural and man-made) for taxiing, takeoff, landing, and low-altitude maneuvering. A pilot relies on natural vision to monitor the flight scene topography, but in degraded visual conditions or other situations where a pilot's natural vision is compromised, other "visualization" methods are required.

In Title 14 Code of Federal Regulations (14 CFR) Section 91.175(1), the Federal Aviation Administration (FAA) authorizes the use of an Electronic Flight Vision System (EFVS) as a landing aid. Section 1.1 defines an EFVS as "an installed aircraft system which uses an electronic means to provide a display of the forward external scene topography (the applicable natural or manmade features of a place or region especially in a way to show their relative positions and elevation) through the use of imaging sensors, such as forward-looking infrared, millimeter wave radiometry, millimeter wave radar, or low-light level image intensification."

The regulation states that an operator (pilot) is authorized to use EFVS in lieu of natural vision to proceed from a decision height of 200 feet down to 100 feet above touchdown zone elevation for certain straight-line instrument approach procedures (IAP).

On 11 Jun. 2013, the FAA published a notice of proposed rulemaking change to extend the use of EFVS to permit operators to use EFVS in lieu of natural vision to continue descending below 100 feet to touch-down zone elevation [Federal Register, Vol. 78, No 112].

For rotary-winged aircraft, especially for military missions, pilots must land or operate their aircraft at low altitudes in degraded visual conditions that may be created by airborne dust, sand, water, snow and other small particles and/or low light conditions. In these situations the pilot must be aware of all man-made and natural hazards that threaten safety of the aircraft and its crew. If landing, the pilot must also be aware of the terrain slope in the landing zone. EFVS solutions are being sought by the military to address these challenges and enable safe operation of aircraft in degraded visual environment conditions.

Technology associated with Unmanned Aircraft System (UAS) platforms, referred to herein as "drones," has significantly advanced over the last several decades. There are many benefits of deploying drones.

Drones can fulfill missions that are deemed dull and/or dangerous, such as border and coastal patrol and monitoring; search and rescue; fire detection and firefighting; and disaster operations. Their unique flight capabilities and characteristics offer new observational capabilities for monitoring natural resources and weather phenomena that impact our society, such as water resources and flooding events; ice sheets, glaciers and navigation routes in polar regions; and tropical cyclones and severe ocean storms. Drones can also potentially be used for mundane tasks such as package pick-up and delivery.

Drones can be designed more efficiently to execute their missions because significant aircraft resources (power, weight, size) need not be utilized to accommodate manned crews.

Automated ground collision avoidance systems facilitate safe navigation of all types of aircraft, manned and unmanned. Such automated ground collision avoidance systems rely heavily on digital elevation models, digital terrain elevation data, digital obstacle data and other sources of surface elevation data, all collectively referred to herein "digital terrain maps." Automated ground collision avoidance systems must also rely on accurate knowledge of the aircraft's position.

However, digital terrain maps are not completely reliable. For example, because of inherent resolution limitations, a digital terrain map can easily miss steep terrain that has limited spatial extent. Thus, a digital terrain map can easily underestimate true elevation.

Additionally, digital terrain maps are normally based on bare-earth models. Therefore, they do not account for hazards such as trees, buildings, and other man-made structures. In principle, digital terrain maps could be made to show man-made structures. But maintaining accuracy over all airspace on a routine basis is not practically feasible.

An additional disadvantage of digital terrain maps is that they cannot capture dynamic hazards such as other aircraft or vehicles that may be on the runway or taxiways. In some cases, the problem is not that vehicles are moving on the terrain. The problem is that the terrain itself is moving. This arises, for example, when landing an aircraft on a moving platform, such as an aircraft carrier because such a platform may be pitching and rolling in an unpredictable way. It is also difficult to use a digital terrain map to land a vehicle in a populated area because of the unpredictable movement of pedestrians and cars.

Still further, aircraft typically rely on data from its onboard aircraft navigation system. This is generally GPS data. Such data can be compromised, for example if there is no GPS signal available.

An EFVS solution is needed to provide real-time, forward looking scene topography that can be used to independently verify a platform's location and identify hazards to safe navigation (e.g. provide topographic mapping).

One solution relies on forward-looking infrared technology. Forward-looking infrared cameras have been certified and granted landing credits by the FAA. Such aircraft are permitted to descend from a 200-foot altitude to a 100-foot altitude under certain instrument approach procedures.

However, forward-looking infrared technology has limitations, some of which cannot be overcome. For one thing, forward-looking infrared systems are passive systems. Therefore, they only record the emission of the observed scene in their field-of-view. Thus, it is not possible to directly determine the range to any pixel in the image any more than one can determine the distance to the moon from a photograph. Because forward-looking infrared systems cannot provide range information, they cannot provide topographic mapping or geolocated imagery either.

To make matters worse, infrared radiation tends to be absorbed by clouds and fog. This is exactly where a pilot's natural vision is also compromised.

Synthetic vision systems have also been deployed. A synthetic vision system provides situational awareness to the pilot under degraded visual conditions. It does so by using digital terrain maps to deliver visualization and scene symbology to the pilot through some kind of display, such as a heads-up display and/or a heads-down display. However, as discussed above, digital terrain maps have limited accuracy. They generally rely on bare earth models and cannot identify, for example, treetops. And they cannot include moving obstacles. A synthetic vision system also relies on positional information from the aircraft navigation system. Therefore it cannot independently confirm the flight path.

Millimeter-wave radar has been proposed to address these deficiencies. Millimeter-wave radar produces geolocated imagery. It can also operate over a larger range of atmospheric conditions than forward-looking infrared systems.

Radar is not, however, without its own challenges. In particular, it can be difficult to achieve acceptable image resolution. This is particularly the case when one is inspecting surface backscatter measurements of distributed scenes, such as grass and runaway structures. In such cases, it is useful to average several independent looks to reduce the fading-induced speckle in the image. The reduction in image quality caused by fading depends on the number of independent looks. The effective resolution is equal to the radar resolution $(r_x \cdot r_y)$ times the gray-level resolution factor $(r_g)$:

$$r_g \approx \frac{\sqrt{N} + 1.282}{\sqrt{N} - 1.282}$$

where N is the number of independent looks averaged. For the forward-looking case, the radar pixel resolution is determined by the sampling geometry (i.e. range and incidence angle), antenna beamwidth, radar range resolution, and platform velocity. As the antenna beamwidth is narrowed to achieve high resolution, the Doppler bandwidth also narrows. This results in longer decorrelation times, or in other words, a lower number of independent looks (N). This results in degraded effective image pixel resolution because the gray-level resolution factor $r_g$ increases.

Mechanical scanning of the antenna beam has been the conventional approach for millimeter-wave radar. Such mechanical scanning has at least the following disadvantages: the refresh rate is limited by the mechanical scanning rate; the volume occupied by the instrument increases to include the volume that the antenna is scanned through; the absolute alignment of the antenna beam can be costly and require maintenance; the system reliability decreases; the number of looks per pixel is reduced by approximately the field-of-view divided by the antenna beamwidth or processed azimuth beamwidth; the azimuth resolution is degraded by the continuous sweep of the antenna beam; and the azimuth width of the field-of-view is affected by changes in roll and yaw during a scan unless a gimbal is used to compensate for platform attitude changes.

Electronic scanning, either in frequency or in phase, can overcome some of the above disadvantages. Electronic scanning significantly increases the scan rate, partially or entirely eliminates moving parts, and reduces overall instrument volume. But it too has significant limitations.

For one thing, the number of looks per pixel, compared with a system that simultaneously views the entire field-of-view, is reduced by at least the field-of-view divided by the antenna azimuth beamwidth or processed azimuth beamwidth. Frequency scanning requires significant bandwidth (>10% to 15%) to achieve wide-angle field-of-view. The transmit bandwidth and frequency agility bandwidth allocation must be small compared to the frequency scan bandwidth to prevent steering or widening of the antenna beam.

Another problem is that the accuracy an electronic phase scanning system's phase shifters limits its beam pointing accuracy. As a result, it becomes necessary to calibrate from array to array. In addition, the phase shifter's performance also depends on ambient temperature. As a result, it is also necessary to calibrate over time with the same array as temperature changes.

Because the decorrelation time for typical scene topography for EFVS applications is long and dictated by the forward movement of the aircraft, mechanical and electronic scanning millimeter-wave radars typically deploy larger apertures to achieve higher azimuth beam resolution. They then average adjacent beams to achieve the final required image resolution. But this then leads to an increase in size, weight, and volume required by the instrument.

To reduce system size, W-band radar can be used to implement an electronic flight visual system. However, for W-band, volume backscatter from atmospheric particles, such as water associated with fog, can be greater than the backscatter from surfaces of interest, such as the runway. This tends to obscure surfaces of interest. Because this is a signal-to-clutter problem, increasing transmit power cannot resolve this issue. Both mechanical and electronic scanning solutions have single points of failure as the RF signal is combined at a signal point. With the FAA proposing EFVS for descending all the way to the touch-down zone elevation, these systems must be exceptionally reliable. Military applications also require very high reliability for takeoff, landing and low altitude maneuvers where the safety of the aircraft and crew rely on the information provided by the EFVS. Likewise, very high reliability is required for automated ground collision avoidance systems. Single point failures in a system can significantly increase fabrication and operational costs to meet high reliability requirements.

Current active and passive EFVS solutions provide flat imagery of the scene topography rather than direct measurement of the topography. When landing or taking off at unimproved or poorly documented landing strips or when operating at low altitudes, flat imagery cannot directly detect vertical objects, man-made or natural, that could threaten the safety of the aircraft. Even at improved airports, a tall object may look lower and closer in the image without 3-dimensional information.

To overcome this limitation, digital terrain maps have been combined with navigational data and/or incorporated into a synthetic vision system to aid the pilot. However these databases may not document all structures (man-made or natural), cannot see mobile platforms (vehicles, aircraft, etc.), and rely on the navigation system to provide an exact position. Therefore technology associated with synthetic vision systems does not absolutely detect all threats and does not independently confirm the aircraft's location and flight path.

Solutions have been proposed for flight path verification using a side looking interferometric synthetic aperture radars (InSAR) to measure and compare scene topography beneath and to the side of flight path to digital terrain maps in real-time to determine platform location in Global Positioning System (GPS) compromised conditions. However, these do not provide the forward scene topography and require additional sensors, such as those described above, to provide visualization of the forward scene topography to capture hazards that are not within the digital terrain maps. Further, these additional sensors only provide 2D imagery.

The problems described above are equally applicable to marine navigation as well.

SUMMARY OF THE INVENTION

The present disclosure describes a phased-array terrain-interferometer as disclosed herein provides a solution that addresses existing weaknesses in current active and passive solutions. The phased-array terrain-interferometer provides a basis for constructing an electronic flight vision system that will: 1) achieve landing credits, provide critical real-time scene topography to enable safe operation of the aircraft at low altitudes, down to the touch-down zone elevation in compromised natural vision conditions, and will permit taxiing and takeoff under these conditions; 2) provide automated navigations systems, such as automated ground collision avoidance systems, with real-time forward scene topography measurements to overcome limitations of digital terrain maps; and 3) offer a means to verify location under GPS compromised conditions. Such a system is not limited to aircraft but is applicable to other mobile platforms, such as ships and land vehicles. Any application, such as marine navigation, requiring visualization and measurement of the scene topography, man-made structures and other platforms within the navigation path will benefit from a system operating along the principles described herein.

A phased array terrain interferometer provides navigation aid to mobile platforms in degraded visual conditions. It provides real-time forward scene topography measurements to automated flight navigation systems and flight path topography for location verification in GPS compromised conditions. The phased-array terrain-interferometer also provides geolocated two-dimensional (x, y) intensity, three-dimensional (x, y, z) topography and velocity imagery for visualization and/or verification of the scene topography and detection of potential threats to safe navigation of the platform.

The phased-array terrain-interferometer may be configured to provide two-dimensional information or three-dimensional information.

An advantage of the phased-array terrain-interferometer includes a reduction in size, weight, and power that enables systems based upon it to meet stringent SWAP requirements.

Another advantage of the phased-array terrain-interferometer is that it provides forward looking two-dimensional imagery in one configuration and three-dimensional imagery in another configuration over a large field-of-view.

In addition, in some embodiments the phased-array terrain-interferometer is capable of providing velocity imagery in both configurations. The phased-array terrain-interferometer therefore enhances the detection of threats to safe navigation of mobile platforms.

A system based on the phased-array terrain-interferometer requires no moving parts. The parallel architecture of such a system achieves high mean-time-between-failure performance and scalability. This allows it to be deployed on multiple types of platforms for different mobile applications.

A system based on the phased-array terrain-interferometer also provides visualization and detection of the forward scene topography, whether man-made or natural, and potential threats for mobile platform operations in clear and degraded visibility conditions down to zero visibility. It also provides navigation systems with real-time forward-looking scene topography for safe navigation at low-altitudes and in amrine environments.

With the capability of observing the entire field-of-view simultaneously with multiple beams and multiple frequencies, a system based on the phased-array terrain-interferometer achieves greater effective resolution than its mechanically or electronically scanned counterparts. Its reconfigurable aperture and measurement techniques allow it to provide optimal sampling and different modes of operation for short and long ranges during airborne, marine, or ground operation.

Enhanced processing techniques that exploit the system architecture enable sub-beam resolution to be achieved further reducing size, weight, and power requirements. Though primarily targeted for Ka-band operation, the principles described herein are agnostic to wavelength and can be used in other bands.

Some embodiments of the invention feature a thinned array architecture. Such architecture reduces size, weight, and power requirements of the overall system. Thinned array architecture provides more compact spacing of array elements, reduces grating lobes, and extends field-of-view. A thinned array also allows multiple bands, such as W-band and Ka-band, to be interleaved. This provides multiple vertical baselines in ultra compact format with no height extension.

Some embodiments feature symmetric receiver design. This permits compact spacing between elements and the ability to easily achieve half-wavelength spaces between elements even at millimeter-wave frequencies.

Some embodiments feature a digital beam forming system architecture. Such architecture permits higher effective image resolution by providing more looks per pixel. Although digital beam forming can be carried out in only one plane, some embodiments feature multi-plane digital beam forming for enhanced effective resolution. In some embodiments, the processing associated with digital beam forming is distributed. This results in greater parallelization, thus promoting reliability, as well has lower cost, and reduced power requirements. Other embodiments feature elevation digital beam forming for implementation of a dynamic multi-vertical baseline interferometric system.

Other embodiments feature a parallel architecture. Such architecture provides increased reliability and greater mean time between failures.

Because the platform is expected to move in the direction of the target, Doppler shift is inevitable. To accommodate this, certain embodiments feature frequency Doppler correction digital beam forming to extend coherent integration, to remove range shift in pulse-compressed waveforms, and to reject direct transmitter-receiver leakage during simultaneous transmission and reception. The resulting extension of coherent integration also reduces system power requirement.

Certain embodiments execute frequency hopping to increase independent sampling and reject round trip echoes.

Certain embodiments execute frequency hopping with pulse-to-pulse phase modulation schemes in the transmitter and receiver to suppress signal spectral leakage between frequency sub channels to allow closer spacing of frequency sub channels in order to increase number of sub channels within a fixed operating bandwidth or decrease the total aggregated bandwidth utilized.

Other embodiments promote higher resolution and accurate measurement of rapidly changing scenes by carrying out frequency diversity digital beam forming.

Yet other embodiments carry out frequency diversity Doppler processing to extend Doppler Nyquist range.

Other embodiments eliminate blind regions and provide more accurate positioning of strong scattering features by using transmitting waveforms with multiple frequencies.

Although embodiments can operate at any frequency, Ka-band operation offers enhanced image contrast, better tolerance to atmospheric scatterers, and higher effective resolution.

Embodiments according to the invention use forward-looking radar interferometry to provide unflattened intensity and 3D topographic imagery to enable an operator to evaluate heights of obstacles. This is particularly useful since higher obstacles tend to pose greater threats to navigation. Height features can be ascertained at lower resolution due to scattering bias allowing for lower size, weight, and power requirements.

Embodiments of the invention are also able to carry out location detection even when no GPS signal is readily available.

In some embodiments, the interferometer integrates with a synthetic vision system. In others, the interferometer provides data that can be used by a collision avoidance for real-time height anomaly detection.

In some embodiments, height measurements provide direct detection of various airport features or navigation features and permits interpretation without reliance on scattering properties.

The phased-array terrain-interferometer provides height directly allowing direct integration into collision avoidance systems.

Embodiments of an interferometer carry out digital beam forming radar interferometry to minimize phase drift effects across image. Other embodiments carry out differential interferometry for height anomaly detection and phase unwrapping robustness. A particularly compact interferometer is one that implements Ping-Pong interferometry.

A difficulty inherent in interferometry arises from the periodicity of the interferometric phase signal. To address this, certain embodiments implement two or more vertical baselines for extending the range of interferometric phase unwrapping. Alternatively, a multi-frequency baseline extends interferometric phase unwrapping while maintaining a compact and light interferometer with minimal power requirements.

Embodiments of the invention include internal calibration. In some embodiments, such internal calibration permits built-in testing and complex transceiver gain monitoring. In other embodiments, the internal calibration includes phase modulation within a loop to achieve ultra-high precision complex transceiver gain monitoring by providing significant additional leakage signal suppression. In other embodiments, the internal calibration includes a switchable attenuator with transmitter or receiver phase modulation to achieve ultra-high precision complex transceiver gain monitoring by providing significant additional leakage signal suppression. In other embodiments, internal calibration system uses a dual internal calibration pulse to improve leakage suppression through reduction of phase noise.

In some embodiments, the interferometer is implemented with solid-state electronics, thus allowing higher mean time between failures, higher efficiency, and lower costs.

Other embodiments include a module that rejects additive coherent interference signals by carrying out digital phase alternation.

Some embodiments feature a multi-channel digital receiver to provide multi-round trip detection and thermal noise monitoring improvement to extend lower dynamic range.

Some embodiments feature dual down conversion with SSB and dynamic local oscillator to reduce digital receiver sampling requirements and extend a frequency-hopping window while minimizing SWaP.

In some embodiments, the interferometer provides radial velocity imagery to detect moving threats.

An interferometer according to the invention provides a suitable basis for use in an EFVS system for takeoff, low altitude flight, landing and taxiing.

Embodiments of the invention can also be used for marine debris detection using interferometric phase and correlation. This tends to overcome the problem of sea spike and sea clutter.

Some marine embodiments may interchange mechanical scanning sub-assemblies for the phased arrays to reduce costs. This may be possible where there is sufficient space to accommodate the added space needed by the mechanical scanning antennas.

It can therefore be seen that the present disclosure provides a compact system that can be incorporated into fixed-wing or rotary-wing aircraft, or marine vessels, manned or unmanned, and that can provide a visual aid and/or direct measurements that the pilot or flight navigation system can use to verify the flight path scene topography and to identify man-made and natural threats to safe navigation.

BRIEF DESCRIPTION OF THE DRAWINGS

While the specification concludes with claims particularly pointing out and distinctly claiming particular embodiments of the instant invention, various embodiments of the invention can be more readily understood and appreciated from the following descriptions of various embodiments of the invention when read in conjunction with the accompanying drawings in which:

FIGS. 10, 10A, 10B show internal calibration module block diagrams; and

DETAILED DESCRIPTION OF THE INVENTION

Figure 1:
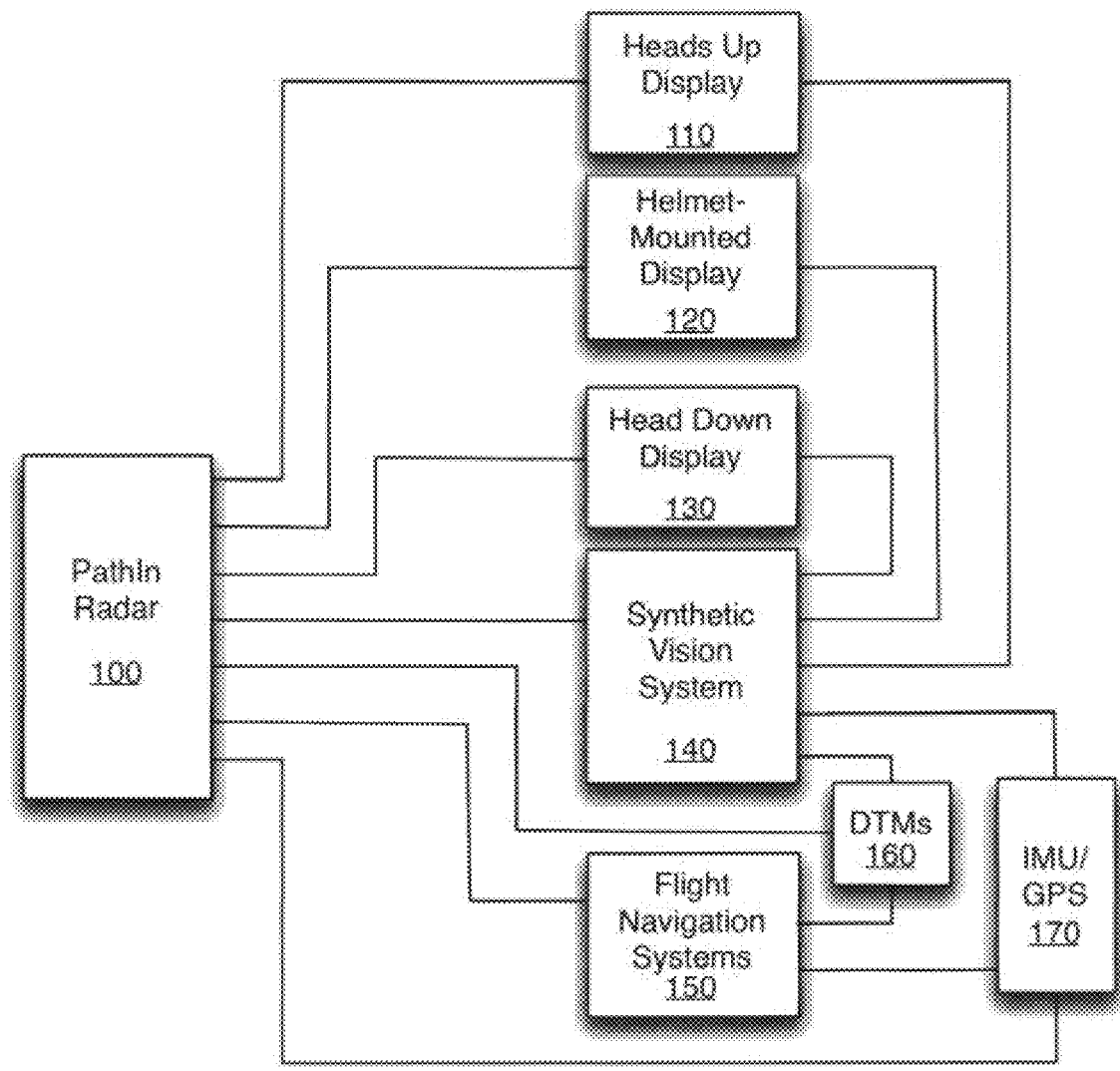
FIG. 1 shows a block diagram of phased-array terrain-interferometer illustrating various components with which it will operate.

Referring now to the drawings, an exemplary embodiment of the invention is generally indicated at 100 in FIGS. 1-11.

Figure 2:
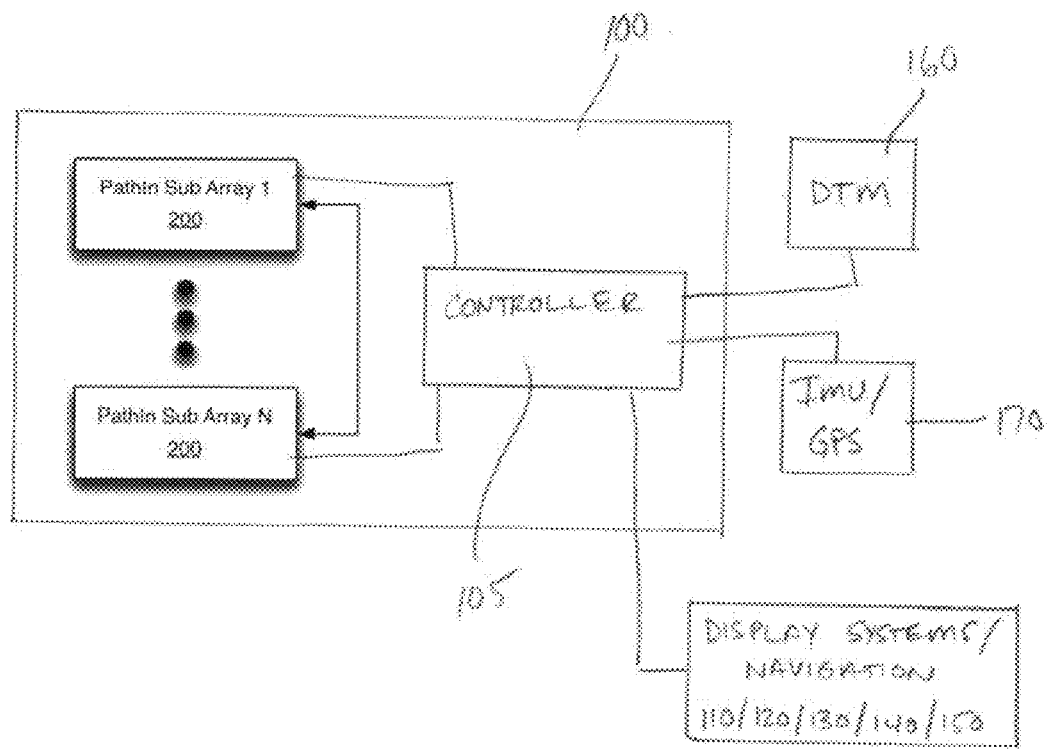
FIG. 2 shows another high level block diagram of the PathIn radar system including the sub-arrays of the phased-array terrain-interferometer of FIG. 1.
Figure 3:
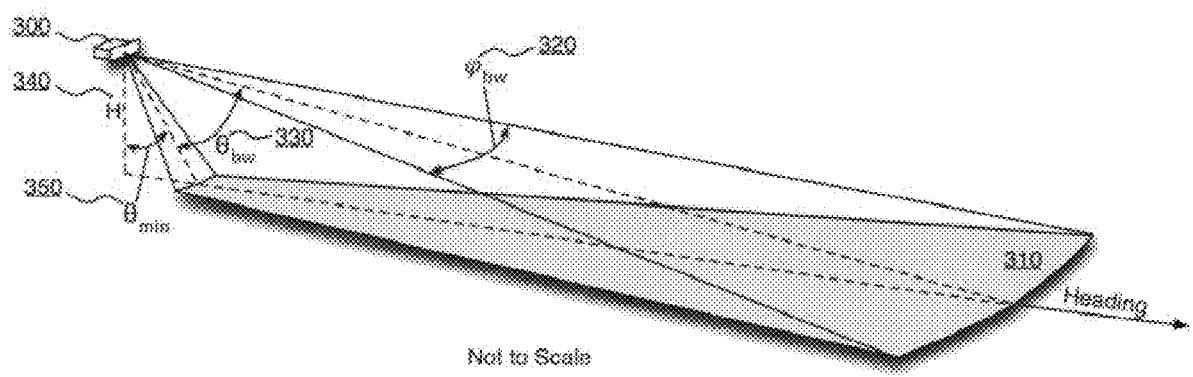
FIG. 3 shows the measurement geometry and field of view of the phased-array terrain-interferometer of FIG. 1.

In FIGS. 1-3 there is shown a phased-array terrain-interferometer 100 that can be configured with one or more radar sub-arrays 200 (See FIG. 2). Each sub-array 200 profiles the complex receive backscatter signal from an illuminated area 310 (i.e. forward-looking scene topography) shown in FIG. 3. It should be noted here that while the exemplary embodiment is described in connection with "forward-looking" topography for aircraft, the system has applicability in any direction of movement. For example, a rotary wing aircraft or a marine vessel can move both sideways and backwards. Additional systems could be implemented to look in those directions as well to provide coverage for movement in those directions.

FIG. 1 shows a number of different devices with which the phased-array terrain-interferometer 100 can operate. For convenience, all the devices are shown in one figure. However, this does not mean they must all be present at the same time. The devices are only shown together in one figure to avoid having a combinatorially large number of figures illustrating each of the possible combinations.

In one embodiment, the phased-array terrain-interferometer 100 provides geolocated two-dimensional intensity imagery or symbology to a heads-up display 110 system. In another embodiment, the phased-array terrain-interferometer 100 provides geolocated three-dimensional topographic imagery or symbology and unflattened two-dimensional intensity imagery or symbology to the heads-up display 110 system.

In both of the foregoing embodiments, the phased-array terrain-interferometer 100 offers imagery or symbology that permits a pilot to visualize forward scene topography in clear and degraded visual conditions through the heads-up display 110 system. This permits safe navigation during takeoff, low altitude flight, landing and taxiing. The phased-array terrain-interferometer 100 in both embodiments can provide geolocated radial velocity imagery or symbology to the heads-up display 110 system to aid in hazard detection and scene interpretability.

The phased-array terrain-interferometer 100 communicates with the heads-up display 110 system through an appropriate communications interface such as the Avionics Digital Video Bus ARINC 818. Herein, the communication interface between the phased-array terrain-interferometer 110 and any other system shown in FIG. 1 will be assumed to be through the appropriate interface for that system. This may include, but is not limited to, ARINC 818, Gigabit Ethernet, 10 Gigabit Ethernet, and fiber-optic communications interfaces.

In another embodiment, the phased-array terrain-interferometer 100 provides geolocated two-dimensional intensity imagery or symbology to a head-mounted display 120 system. In yet another embodiment, the phased-array terrain-interferometer 100 provides geolocated three-dimensional topographic imagery or symbology and unflattened two-dimensional intensity imagery or symbology to the head-mounted display 120 system.

In both embodiments, the phased-array terrain-interferometer 100 imagery or symbology provides the pilot with visualization of the forward scene topography in clear and degraded visual conditions through the head-mounted display 120 system for safe navigation during takeoff, low altitude flight, landing and taxing. The phased-array terrain-interferometer 100 in both configurations may provide radial velocity imagery or symbology to the head-mounted display 120 system to aid in hazard detection and scene interpretability.

In another embodiment, the phased-array terrain-interferometer 100 provides two-dimensional intensity imagery or symbology to a head-down display 130 system, and in another embodiment, the phased-array terrain-interferometer 100 provides three-dimensional topographic imagery or symbology and unflattened two-dimensional intensity imagery or symbology to the head-down display 130 system.

In both the foregoing embodiments, the phased array terrain interferometer 100 offers imagery or symbology that provides the pilot with visualization of the forward scene topography for clear and degraded visual conditions through the head-down display 130 system. The phased-array terrain-interferometer 100 in both embodiments may provide geolocated radial velocity imagery or symbology to the head-down display 130 system to aid in hazard detection and scene interpretability.

In another embodiment, the phased-array terrain-interferometer 100 provides geolocated two-dimensional intensity imagery or symbology to a synthetic vision system 140. In another embodiment, the phased-array terrain-interferometer 100 provides geolocated three-dimensional topographic data and unflattened two-dimensional intensity imagery to the synthetic vision system 140.

The phased-array terrain-interferometer 100 provides intensity imagery or symbology that is overlaid on the synthetic vision system 140 topography scene to provide visualization of hazards not contained within its digital terrain maps 160. The phased-array terrain-interferometer's 3D topographic measurements provide direct validation of the digital terrain maps 160 and can detect and report height anomalies.

A high level block diagram is shown in FIG. 2 where the system 100 includes a plurality of radar sub-arrarys 200, a main controller 104, the DTM 160 and IMU/GPS 170 inputs as well as possible display and navigation outputs 110/120/130/140/150.

Figure 4:
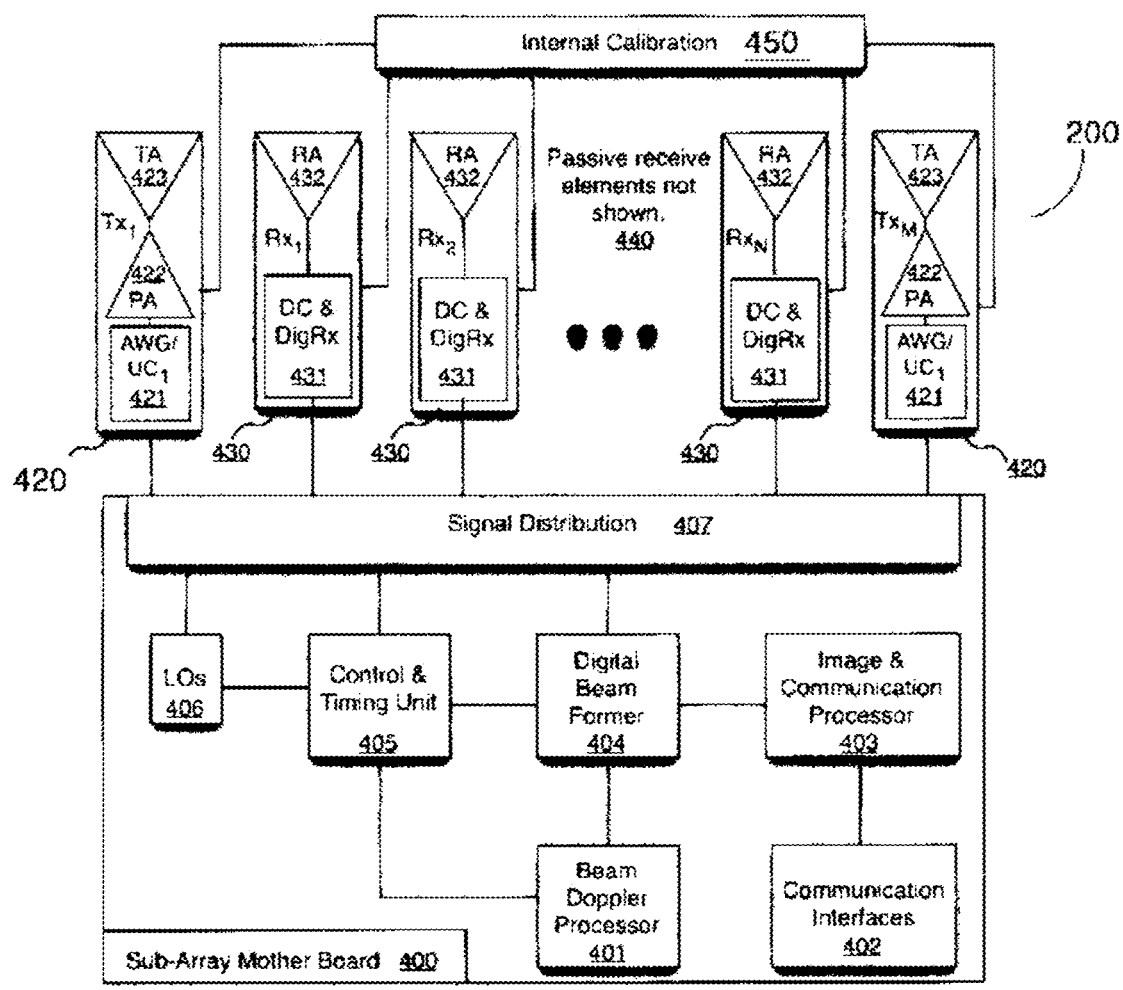
FIG. 4 shows a block diagram of one of the sub-arrays of the phased-array terrain-interferometer of FIG. 1.

Referring briefly to FIG. 4, each sub-array includes one or more transmitters 420 to illuminate the terrain (topography) and a plurality of receivers 430 to receive and process the backscatter.

Referring back to FIG. 3, the bounds of the illuminated area (i.e. topography) are defined by the azimuth sector beamwidth ($\varphi_{bw}$) 320, which is typically centered, but is not required to be centered, around the platform heading 360. The figure also shows the minimum incidence angle ($\theta_{min}$) 350; the elevation beamwidth ($\theta_{bw}$) 330; and the platform altitude (H) 340.

Applying digital beam forming techniques, the sub-array 200 simultaneously forms up to K azimuth receive beams within the azimuth sector beamwidth 320. For each such azimuth receive beam, the sub-array 200 records a complex backscatter profile. From these recorded complex backscatter profiles, the phased-array terrain-interferometer 100 forms two-dimensional geolocated intensity. When configured with two or more sub-arrays 200, the phased-array terrain-interferometer 100 applies interferometric processing methods to measure the height of the terrain at each pixel within the two-dimensional image. This enables it to form a three-dimensional image showing geolocated heights. Such an image will be referred to herein as a "3D topographic image" of the forward scene topography. (see also FIGS. 7 and 11).

With the resulting height data, it becomes possible to correct the location of features detected in the two-dimensional image by accounting for range and height. Thus, the flattening effect of the two-dimensional image can be removed. The result is an unflattened two-dimensional intensity image that reveals the true position and vertical extent of each feature. Additionally, the phased-array terrain-interferometer 100 can also measure the radial velocity of each pixel within this unflattened two-dimensional intensity image.

Figure 6:
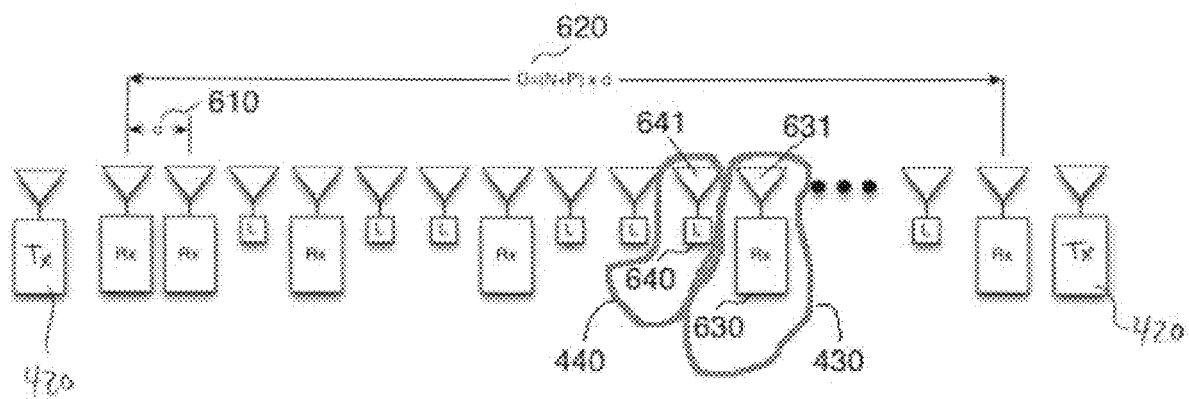
FIG. 6 shows a thinned array architecture.

FIG. 4 shows a block diagram of the interferometer 100. The interferometer 100 includes the sub-array 200 having 1 to M transmitting modules 420 and a thinned receiving array comprising N receiving modules 430 and P passive elements 440. The passive elements 440 are omitted from FIG. 4 but shown in FIGS. 6 and 7A. As shown in FIG. 6, each passive element 440 features a passive load 640 coupled to an antenna 641. Each receiving module 430 includes a receiver 630 coupled to an antenna 631. The interferometer 100 also includes an internal calibration module 450 for calibrating the sub-array 200 and a sub-array motherboard 400 for controlling operation of the sub-array 200.

Each transmitting module 420 contains a transmit waveform module 421, a power amplifier 422, and a transmitting antenna 423.

The illustrated embodiment implements the transmit waveform module 421 as an arbitrary waveform generator in combination with an up-converter. It is this transmit waveform module 421 that creates the waveform that the transmitting module 420 will ultimately transmit.

The power amplifier 422 amplifies the transmit waveform provided by the transmit waveform module 421 and provides it to the transmitting antenna 423 which then launches the wave into free space. This results in illuminating the field-of-view depicted in FIG. 3.

The thinned receiving array captures the backscatter signal from a forward scene that has been illuminated by the transmitting modules 420. As shown in FIG. 6, the N receiving modules 430 and P passive element modules 440 of thinned receiving array are interleaved across the array's aperture.

Each receiving module 430 comprises a receiving antenna 432 and a receiver 431. The particular embodiment as shown implements the receiver 431 as a down converter in combination with a digital receiver. The receiving antenna's radiation pattern covers the field-of-view depicted in FIG. 3. Note that the transmitting modules 420 have separate radiating elements. This permits simultaneous transmission and reception by the array.

Each sub-array 200 further includes a signal distribution bus 417, local oscillators 406, a control and timing unit 405, digital beam former 404, image and communication processor 403, communication interface 402 and beam doppler processor 401 all connected to a main sub-array mother board 400.

Figure 5:
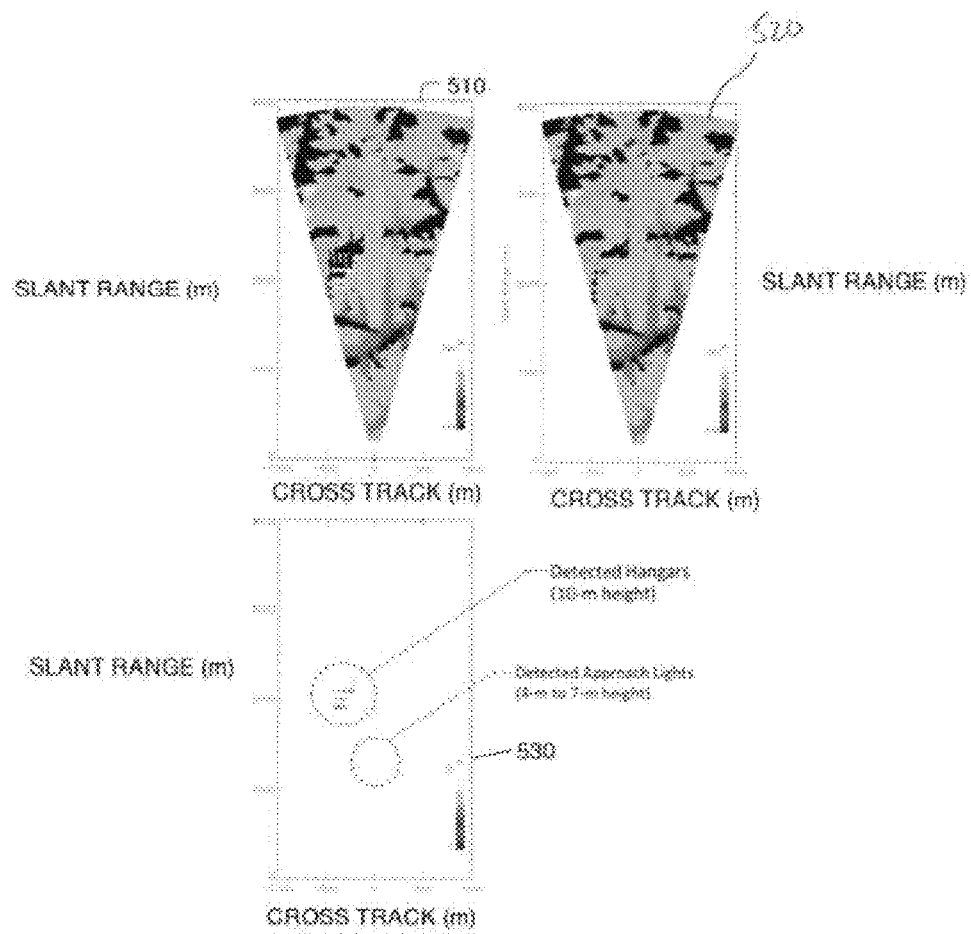
FIG. 5 shows examples of 3D topographic imagery and hazard detection provided by the phased-array terrain-interferometer.

FIG. 5 shows three-dimensional topographic imagery 510 of the forward scene topography of an airport scene as provided by a phased-array terrain-interferometer 100. The digital terrain map's topographic image 520 has been mapped to the same pixels for comparison. It is apparent from such a comparison that the digital terrain map is missing certain potential important obstacles. For example, the digital terrain map completely misses the hangars and approach lights. The topographic imagery 510 provided by the phased-array terrain-interferometer 100, on the other hand, clearly shows these missing obstacles.

The phased-array terrain-interferometer 100 can provide a geolocated hazard or height anomaly map 530 to the synthetic vision system 140 to alert the operator, e.g. the pilot, of these hazards. Thus, the phased-array terrain-interferometer 100 provides real-time updates of the digital terrain maps 160 to detect hazards and features that may well be missing from the digital terrain maps 160. Moreover, if the digital terrain map 160 lacks data for the current location, or if such data is otherwise unavailable, the phased-array terrain-interferometer 100 fills in this gap by providing the synthetic vision system 140 with the relevant topographic imagery.

In another embodiment, the phased-array terrain-interferometer 100 provides geolocated two-dimensional intensity imagery and three-dimensional topographic imagery to a flight navigation system 150. An example of a flight navigation system 150 is a collision avoidance system used to detect and avoid topographic hazards and other hazards to safe navigation. In some embodiments, the flight navigation system 150 may be an automated system. In other embodiments, the flight navigation system 150 alerts the operator.

As shown in FIG. 5, the phased-array terrain-interferometer 100 provides imagery 510, 530 that can be used to detect hazards and features that are missing from the digital terrain maps 160. Alternatively, if the digital terrain maps 160 lack data associated with the current scene or such data is otherwise not available, the phased-array terrain-interferometer 100 can provide topographic data for the forward scene topography to the flight navigation system 150.

In another embodiment, in GPS compromised conditions, the phased-array terrain-interferometer 100 provides 3D topographic imagery of the forward scene topography that can be correlated with the 2D topographic data of the digital terrain maps 160 to determine the platform location while also providing detection of navigation hazards along the flight path. During a landing approach under degraded visual conditions and GPS compromised conditions, the phased-array terrain-interferometer 100 can thus verify position and also provide unflattened imagery of the forward scene topography for visualization of airport features.

The foregoing ability is useful for more than just landing an aircraft. Interferometric phase and correlation also provides a way to navigate through a debris field of randomly placed and possibly moving hazards such as one might encounter during overland navigation or during marine navigation.

Figure 7:
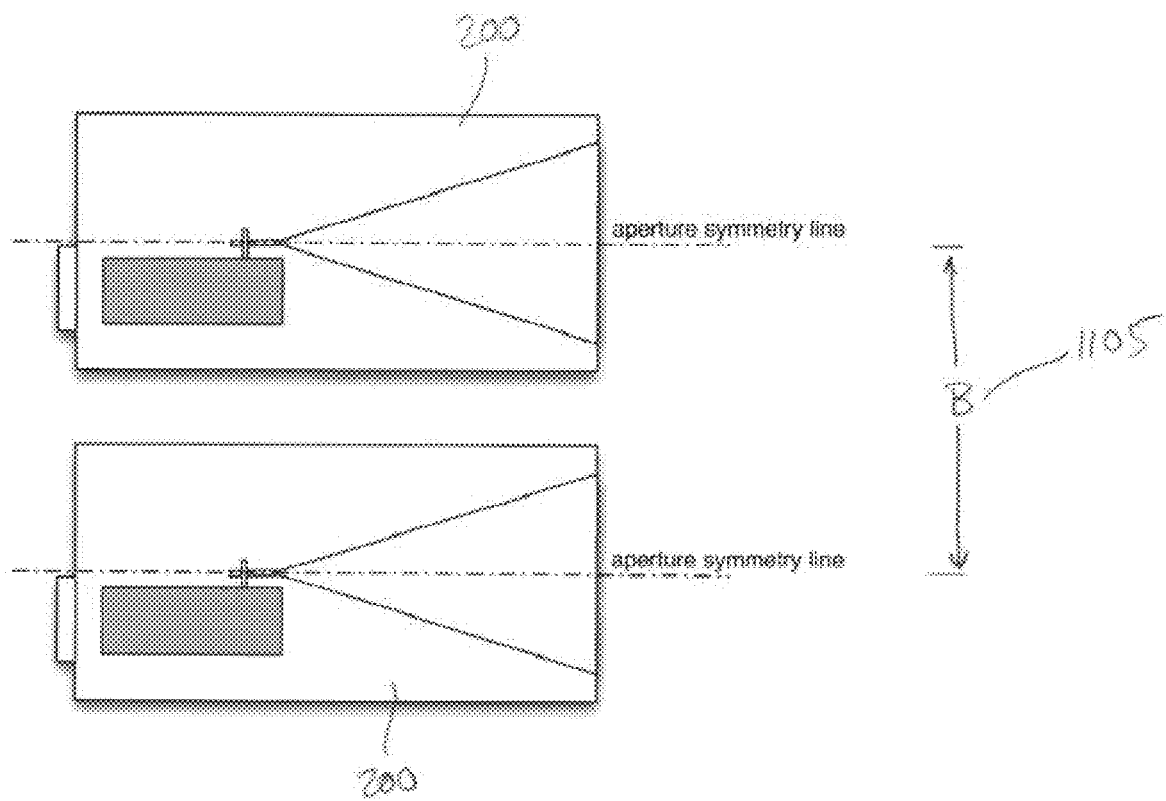
FIG. 7 shows a side view of two vertically spaced sub-arrays and their configured baseline spacing.
Figure 7A:
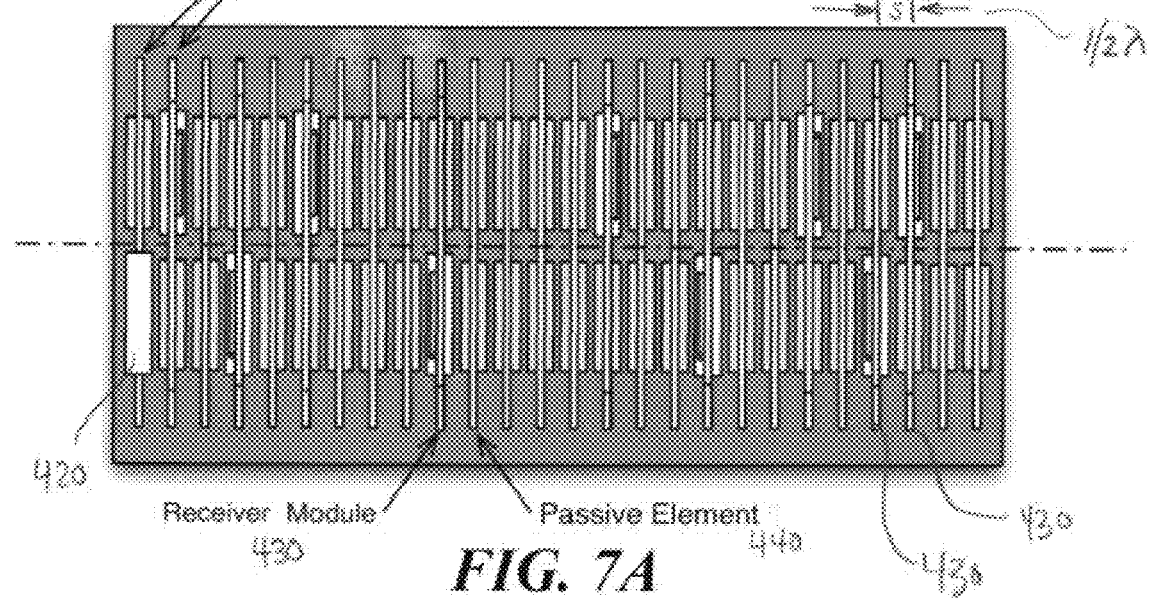
FIG. 7A shows a top view of the sub-array backplane and a symmetrical design approach within the array.

FIGS. 6 and 7A better illustrate the thinned array architecture. Uniformly spaced gaps 610 of spacing d separate the individual elements of the receive array. The array extends across an aperture 620 having an aperture width D in the horizontal plane, with $D=(N+P)d$. In principle, a non-uniform spacing could also be used to separate the elements of the receive array.

FIG. 7A illustrates a thinned-array backplane having a longitudinally extending aperture symmetry line and a plurality of pairs of module sockets symmetrically spaced above and below the aperture symmetry line. Each pair of module sockets is equally spaced along the aperture symmetry line, although an uneven spacing could be used in some embodiments. A transmitter module 420 has transmitter components on one face thereof and is located at one end of the backplane. A plurality of active receiver modules 430 each has receiver components on one face thereof. A plurality of passive receiver modules 440 are also shown interleaved with the receiver modules 420. As can be seen, the receiver modules are rotated by 180 degrees such that the receiver components face in opposing directions and such that a spacing s between the receiver components is one half wavelength of the operating wavelength of the apparatus.

The thinned array affords the phased-array terrain-interferometer 100 several advantages.

First, the using a thinned sub-array 200 means that only a fraction of the array elements actually requires receiver modules 440. This reduces weight and power consumption.

An additional advantage of a thinner sub-array is that the remaining receiving modules 430 can be positioned in a way that not only takes into account the final radiation patterns but also the distribution of the heat produced by the receiving modules 430 within the receive array and the isolation between individual receive modules. This reduces the need for heat sinks or conductive elements for heat distribution. As a result, this also reduces the overall system's size, weight, and cost.

Moreover, since heat is a significant factor in the failure of most electronics, the lower and more uniform heat distribution associated with a thinned array also tends to increase mean-time-between-failures.

The exemplary embodiment requires that no more than two adjacent element locations be populated with a receiver module. This arrangement permits a sub-array 200 to be symmetric, as shown in the example shown in FIG. 7A. As a result, the receiver module can be rotated 180 degrees. By doing so the components of adjacent receiving modules 430 face the opposite direction. This allows their height to be almost twice the element spacing. This makes it possible to set the spacing s between array elements to be a half wavelength even when operating at millimeter-wave frequencies. The resulting array antenna pattern thus avoids grating lobes and yields a wide field-of-view.

Referring back to FIG. 4, a signal distribution bus 407 captures the complex-valued signals from the sub-array 200 and provides them to a digital beam former 404.

The digital beam former 404 then uses digital beam forming methods to image the forward scene topography. In particular, the digital beam former 404 implements multi-plane digital beam forming.

In multi-plane digital beam forming, either a discrete Fourier transform or a fast Fourier transform is applied to the complex profiles along with phase and amplitude weightings. This implementation forms up to N azimuth beams that span the field-of-view. The choice of whether to use a discrete Fourier transform or a fast Fourier transform depends on the array's size and the extent to which the array has been thinned, as expressed by a thinning factor.

The phase and amplitude weightings are slightly adjusted from plane to plane to create a fixed offset in the pointing of each set of beams from plane to plane.

For example, suppose the sub-array's digital beam former 404 produces forty azimuth beams, each of which has a one degree beamwidth. Suppose the digital beam former 404 points these beams so that they cover the forty one-degree sectors within an azimuth range of between −20 degrees and +19 degrees.

For the next plane, the digital beam former 404 will again forms the forty beams. But this time, it offsets the angles in which the beams point by 0.1 degree. This results in forty beams, each one being one degree wide, that collectively span the azimuth range from −19.9 degrees to +19.1 degrees, again in one-degree steps.

In a preferred embodiment, the digital beam former 404 carries this out over ten planes. This results in four hundred one-degree azimuth beams with the beams in one plane being offset from corresponding beams in an adjacent plane by 0.1 degrees. This processing occurs within each transmit-receive period.

It is apparent therefore that although the beams from plane to plane are not independent, the sub-array nevertheless oversamples the scene in azimuth by applying different weighting coefficients. This oversampling improves the effective resolution of the sub-array to an extent that is sufficient to render visible many small but nevertheless important features that would be invisible to conventional radar. These features include runways, which may appear large on the ground but are actually very small when viewed from an approaching aircraft. These features also include other man-made structures that one might prefer to avoid colliding with when landing an aircraft.

The oversampling approach as described above also permits a smaller aperture to be deployed without compromising resolution. This results in a smaller and lighter array, which is particularly useful for smaller aircraft, such as drones. The configuration also minimizes the number of required receivers, thus reducing power consumption, cost, and improving heat distribution, thereby promoting a longer lifetime.

In another implementation, the digital beam former 404 carries out a distributed digital beam forming method.

In distributed digital beam forming, the digital receiver within the receiver 431 implement sub channels. Each sub channel represents one of the N azimuth beams that will be formed. Amplitude scaling and phase rotation is applied within each sub channel according to the azimuth angle of the beam being formed and receiver position within the array. The complex profiles of each sub channel are then accumulated across the array. This results in N complex receive-profiles at N different azimuth angles. By distributing the processing associated with digital beam forming across many digital receivers, this approach reduces power consumption, promotes more even heat distribution, and improves reliability by providing parallel processing.

To achieve a high effective resolution of two and three-dimensional images without increasing size, weight, and power consumption, the phased-array terrain-interferometer 100 must overcome the long decorrelation times associated with high-resolution forward-looking geometry. One way to accomplish this objective is for the sub-array 200 to engage in frequency hopping techniques that are well suited for digital beam forming. In particular, by changing the center frequency on a pulse-to-pulse basis, the phased-array terrain-interferometer 100 causes the backscatter signal at each frequency to be independent. This permits speckle reduction by averaging the independent looks.

A sub-array 200 can implement frequency hopping in three different ways.

First, the center frequency of the transmit pulse generated by the transmit waveform module 421 within the transmitting module 420 is stepped through a sequence of frequencies. The step size is greater than one-half the transmit bandwidth of the previous pulse. In some embodiments, the receiving modules 430 implement a two stage down conversion. Each stage uses single sideband demodulation to reject the other noise sideband, thereby improving signal-to-noise ratio. A local oscillator then outputs a frequency for driving either the first stage or the second stage. This oscillator follows the transmit waveform frequency as it steps through the sequence of frequencies. The result is a constant intermediate frequency at the input of the digital receiver. In doing so, the bandwidth of the digital receiver is minimized to keep power consumption down. In other embodiments, the receiving modules implement a single stage down conversion.

In some cases, observation time is limited as a result of pixel resolution, target motion, and/or platform motion. For these cases, the sub-array simultaneously transmits using two or more transmitting modules 420 with each transmitting module 420 transmitting at a frequency that is shifted from that used by others. The receivers 431 implement multiple sub-channels that separate and process the backscatter return signals from each transmitted signal independently. This enables the sub-array 200 to obtain independent measurements of each pixel even in the extreme case where the target within the pixel is only present for a single transmit-receive period.

The third way in which the sub-array 200 can obtain independent looks is to generate a frequency diversity transmit waveform. Such a waveform comprises multiple waveforms separated in frequency.

Figure 8:
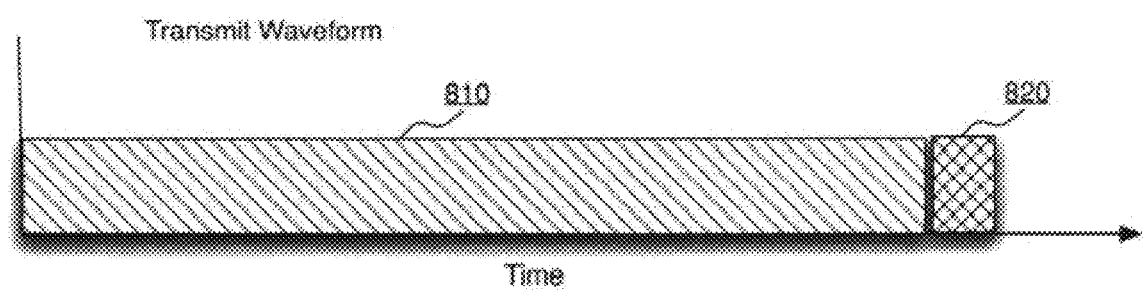
FIG. 8 shows an example of the frequency diversity transmit waveform.

FIG. 8 shows a two-pulse version of such a waveform, though in the general case more than two pulses can be used. A first pulse 810 is a long encoded waveform such as a non-linear frequency modulated waveform. A second pulse 820, which immediately follows the first pulse 810, is a fixed frequency pulse modulated signal with an amplitude taper to minimize its frequency spread. The first and second pulses 810, 820 are separated in frequency and may or may not have the same the bandwidth.

As with the previous case, a digital receiver separates the simultaneous return from the first and second pulses 810, 820. Because the signals are shifted in frequency, they provide independent looks at each pixel.

For strong scatterers, such as vehicles or buildings, the encoded pulse 810 will result in range side lobes. These side lobes may mask other nearby features that are much weaker scatters and will not depict the true shape of the strong scattering feature. The second pulse 820 will accurately profile the strong scatter in range to help discern its true extent. The return from the second pulse 820 also provides the ability to profile the scene in close proximity to the sub-array that would otherwise be in the blind region of the longer pulse 810.

Figure 8A:
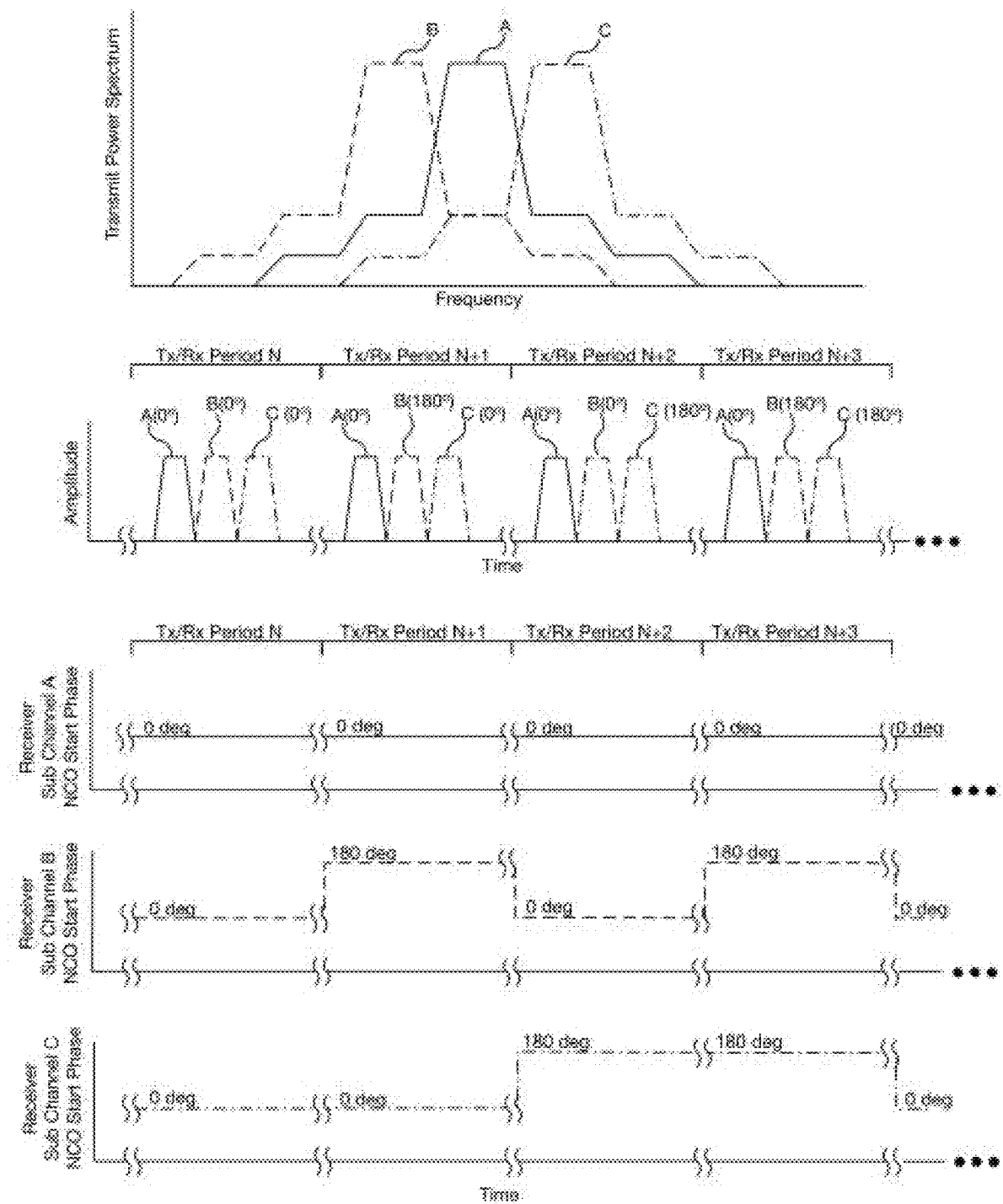
FIG. 8A shows an example of a transmit spectrum, transmitter phase modulation scheme and receiver phase modulation scheme associated with frequency hopping using pulse-to-pulse phase modulation.

The number of independent frequency sub channels that can be utilized with frequency hopping, especially in the case where simultaneous returns from more than one frequency sub channel will be present, can be limited by spectral leakage between transmit pulses of adjacent or nearby frequency sub channels. FIG. 8A shows a transmit spectrum of three pulses centered at sub channel frequencies A, B and C. Though the sub channels are separated by more than one bandwidth, each of their spectrums leaks into the other sub channel's passband. The digital receiver sub channel bandpass response cannot eliminate this leakage since it is in band. To suppress this in band leakage without requiring further separation of the center frequency of each transmit pulse, the start phase of the transmit pulses for each sub channel are modulated with a different pattern from transmit-receive period to transmit-receive period. The start phase of the digital receiver's local oscillator (NCO) for each sub channel is also modulated in the same manner as the transmit pulse start phase for each sub channel. Coherently averaging each sub channel's receive profiles over the length of the modulation schemes (in this case 4 transmit-receive periods), leakage from sub channels B and C into sub channel A will be suppressed, leakage from sub channels A and C into sub channel B will be suppressed leakage from sub channels A and B into sub channel C will be suppressed. As with the internal calibration phase modulation approach, the amount of suppression will depend on the phase noise of the transmit pulses and the coherence of the receive profiles. Using this approach, the sub channel frequency separation can be reduced allowing for more sub channels within a fixed RF bandwidth or reduced frequency spectrum use for a fixed number of sub channels.

As a result of the foregoing innovations, the phased-array terrain-interferometer 100 can operate with a smaller aperture diameter while still achieving high effective resolution in its imagery.

The phased-array terrain-interferometer 100 can be built to operate at W-band. However, a preferred band for operation is Ka-band. This is because, for the viewing geometry of the phased-array terrain-interferometer 100, Ka-band scattering presents a much higher contrast ratio than higher frequency millimeter-wave bands, such as W-band, and lower frequency bands, such as X or Ku-band.

The higher contrast ratio arises in part because when Ka-band illuminates a typical scene, the backscatter is a mixture of smooth and rough scattering. In contrast, at higher frequencies, most of the backscatter will be rough, and at lower frequencies, most of the backscatter will be smooth.

A particularly important aspect of a safe landing is that the aircraft should touch down on the runway, and not on the grass on either side of the runway. It is therefore important for an EFVS to reliably distinguish these features.

Of particular importance for aeronautical applications is that Ka-band scattering from a runway surface tends to be smooth backscatter whereas scattering from adjacent grass will be rough. This introduces several orders of magnitude difference in the scattering between grass and runway. The result of this is a significant improvement in image quality that allows features to be resolved at a lower radar resolution.

An additional reason to prefer Ka band is that volume scattering from water particles is two orders of magnitude lower at Ka-band than at W-band. Thus, dense fog is effectively transparent at Ka-band. In contrast, the volume backscatter from fog at W band can easily exceed the surface scattering from the runway, thus rendering the runway effectively invisible in foggy conditions.

The ability to penetrate fog is also of significant importance in marine navigation, where fog is often a significant factor in shipping accidents. Ka-band can easily cut through the fog to reveal ships, shoals, and other obstacles to navigation.

Finally, the nominal design for phased-array terrain-interferometer 100, including the transmitter, is all solid-state. Solid-state componentry operates at low voltages resulting in very high mean time between failure and tolerance to environmental conditions such as high altitudes and low or high temperatures. The solid-state componentry can be switched on and off at times scales between 10 nanoseconds to approximately 100 nanoseconds. The phased-array terrain-interferometer 100 takes advantage of the ability to turn off and on componentry even within a transmit-receive cycle to lower the power consumption of the system and to reduce the thermal dissipation requirements that results in a lighter weight system.

The phased-array terrain-interferometer's forward viewing geometry, combined with the platform's motion, introduces a Doppler shift at each pixel. The Doppler shift can limit the coherent integration time even though the scene pixel decorrelation time is large. The frequency modulation method described above can also introduces a range shift.

To correct for this Doppler shift, the sub-array 200 implements a two-step process Doppler corrected digital beam forming method. The first step involves correcting for an average Doppler shift and the second step involves correcting for residual Doppler errors that arise from variations in the azimuth beam and range gating.

Figure 9:
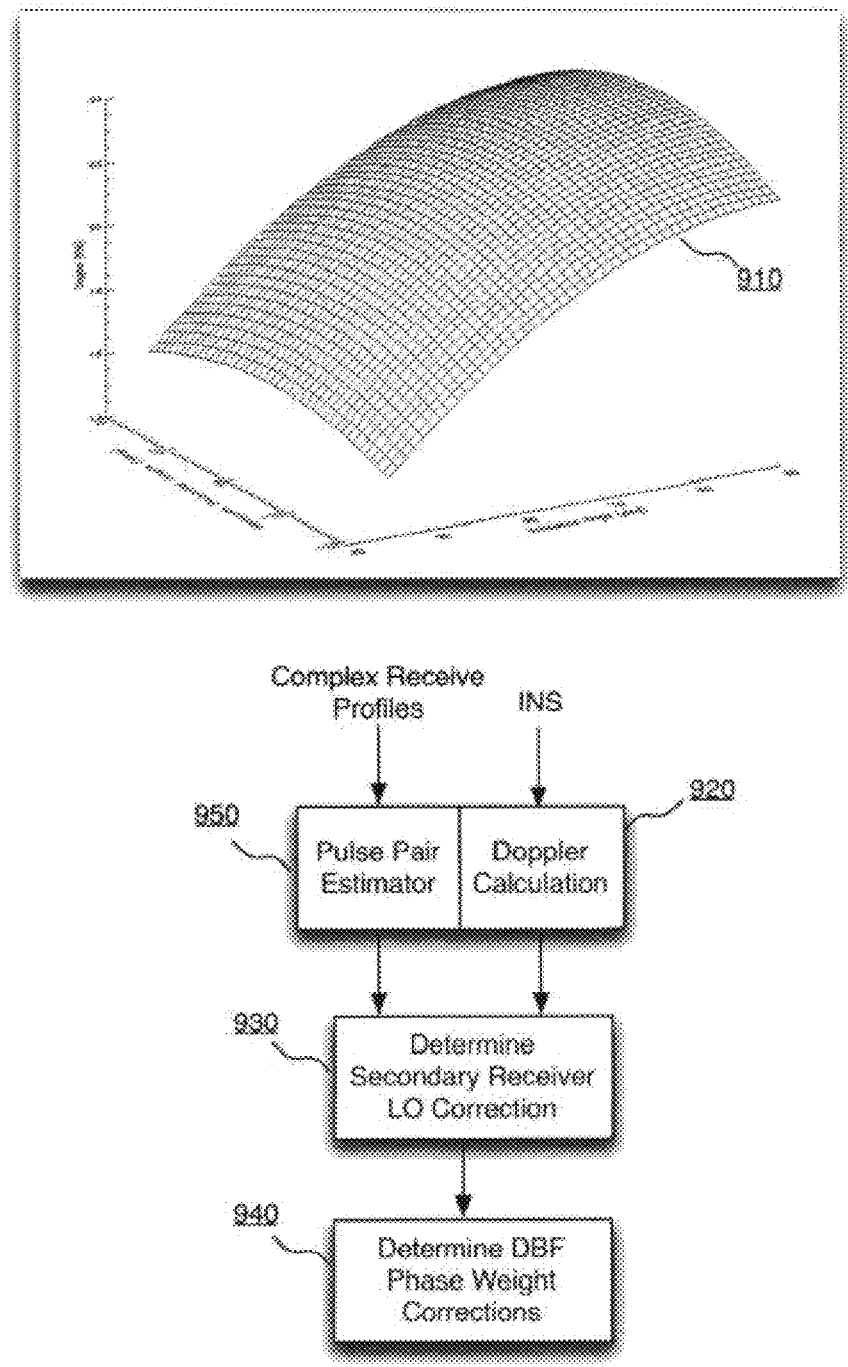
FIG. 9 shows a block diagram of Doppler frequency correction digital beam forming algorithm.

Referring to FIG. 9, the Doppler frequency shift is calculated from data provided by the platform's inertial navigation system data (step 920). Based on this calculation, an average Doppler shift can be added to the local-oscillator frequency of either the primary or the secondary receiver. This average Doppler shift can then be removed during the down-conversion process.

This leaves a residual Doppler shift 910 that is a function of azimuth pointing angle and incidence angle. This residual Doppler shift is determined (step 930) and subtracted from the digital beam forming phase weightings (step 940). As a result, by the time that digital beam forming is carried out, the Doppler shift caused by the platform motion will have been removed.

In some cases, there is no inertial navigation system data available. This does not mean, however, that no Doppler shift correction can occur. Instead, the Doppler phase shift of each pixel can be estimated using a pulse-pair method (step 950). This procedure includes creating a parametric model of the function that represents Doppler shift introduced by the platform's motion and its attitude. This parametric model can then be fitted to the Doppler estimates. From this fit, it is again possible to estimate an average Doppler shift and to proceed as described above.

In an actual system, there is inevitably some leakage between the transmitting modules 420 and the receiving modules 430. However, since there is no relative motion between the two, there is no Doppler shift between them. As a result, either variant of the Doppler corrected digital beam forming approach also has the effect of suppressing direct leakage from the transmitting modules 420 to the receiving modules 430.

Referring back to FIG. 4, the sub-array 200 includes an internal calibration module 450 that measures the complex-valued transceiver function by coupling a portion of the transmit signal into the receivers, and uses it to achieve very high internal calibration signal-to-leakage ratios without requiring high isolation switches. The internal calibration module 450 also supports multiple receiving modules 430 and provides built-in test capability. As shown in FIG. 4, the internal calibration signal is coupled just prior to the final PA 422.

The coupled path is passed through the internal calibration circuit as shown in FIG. 10. The internal calibration circuit 1000 includes a phase switch 1010, a switchable attenuator 1020, and a N-way divider 1030. The phase switch 1010 and switchable attenuator 1020 circuits may be realized in one circuit or device. The outputs of the internal calibration circuit are directed to each receiver module 430 where the internal calibration signal is coupled into the receiver at the antenna port prior to the low noise amplifier (LNA).

The phase switch 1010 transitions between a first state, in which it applies a phase shift of 0 degrees, and a second state, in which it applies a phase shift of 180 degrees. The outputs Rx1, Rx2 . . . RxN, of the internal calibration circuit 1000 are directed to each receiving module 430 where the internal calibration signal is coupled into the receiver at an antenna port prior to the low noise amplifier.

As shown in the lower portion of FIG. 10, the transmit waveform consists of a first waveform 1040 and a second waveform 1050 separated by a brief interval, for example on the order of a microsecond. In some embodiments, each of the first and second waveforms 1040, 1050 is a series of pulses. The second waveform 1050 in the sequence is the traditional transmit waveform. The first waveform 1040 is the calibration signal, which is coupled to the receivers.

During the first waveform 1040, the internal calibration module 450 switches the power amplifier's gate voltage off. This tends to minimize transmit leakage from the transmitting module 420. Using the phase modulator 1010, the internal calibration module 450 then modulates the phase of the internal calibration signal phase by either 0° or 180°. By applying the corresponding phase alternation in the digital receiver and coherently averaging an even number of the internal calibration pulses, the leakage signals will cancel. Although phase noise and variations in the mean leakage phase prevent this approach from achieving infinite leakage suppression, it nevertheless achieves significant leakage suppression. For example, assuming 0.2 degrees of phase noise, this procedure will provide more than 50 dB of additional suppression.

In another configuration, during the first waveform 1040 the internal calibration module 450 switches the power amplifier's gate voltage off. This tends to minimize transmit leakage from the transmitting module 420. Using the switch attenuator 1020, the internal calibration module 450 then modulates the amplitude of the internal calibration signal by either low attenuation state or a high attenuation state. Applying a corresponding phase alternation in the digital receiver of 0° and 180° and coherently averaging an even number of the internal calibration pulses, the leakage signals will cancel while the internal calibration signal will only be slightly reduced by:

$$IC_A = 1 - \frac{l_H}{l_L}$$

where $l_H$ and $l_L$ are the path loss through the switchable attenuator in high and low attenuation states. Although phase noise and variations in the mean leakage phase prevent this approach from achieving infinite leakage suppression, it nevertheless achieves significant leakage suppression.

In one configuration, the internal calibration module 450 monitors the power amplifier's gain using a detector. In most deployments, the power amplifier 422 operates in saturation. As a result, its gain will be very stable.

An alternative configuration is one that couples the transmit signal after the power amplifier 422. This allows direct capture of the power amplifier's effect on the transceiver's transfer function. In this configuration, the internal calibration module 450 operates in the same manner, but the transmit waveform shown in FIG. 10 serves as the internal calibration signal as well.

Either approach results in measuring the sub-array's complex gain transfer function. As a result, calibration does not rely so heavily on strict thermal control of the system to maintain ultra-high gain and phase stability. With the gain and phase being directly measured for each channel, drifts can be removed during processing. The ability to avoid having to incorporate structures that are required for strict thermal control reduces the cost, size, weight, and power consumption while enabling very high-resolution interferometric measurements.

FIGS. 10A and 10B illustrate the differences between the prior art approach and the present disclosure. Generally speaking, the transmitter and receiver gain and phase response (complex transfer function) can change over time. The internal calibration loop measures these changes by directing the transmit signal (prior to the antenna), either with a switch or a coupler through an attenuation loop and into the receiver through another switch or coupler. This signal is measured by the receiver, thus providing a measurement of the transmitter-receiver complex gain transfer function. This approach is illustrated in FIG. 10A (prior art). The accuracy of the internal calibration to measure the transmitter-receiver complex gain transfer function is limited by leakage of the transmit signal into the receiver from other paths (i.e. not internal calibration loop).

$$\text{Error} = (1+V_{LR})/(1-V_{LR})$$

where $V_{LR}$ is the voltage leakage ratio.

Most common path is leakage through the antenna subsystem. In the case of separate transmit and receive antennas, this would be from coupling between the antennas. In the case of a shared transmit-receive antenna, it would be from the limited isolation of the circulator. To increase isolation, a single pole single throw (SPST) switch is typically used (receiver isolation switch). While the internal calibration signal is present, the switch is in high isolation state providing attenuation of transmitter signal leaking into the receiver through the antenna subsystem. After the internal calibration signal is gone (i.e. no longer transmitting) the SPST switch is put in a low isolation state to pass the receive signal from the antenna subsystem into the receiver. Some of the disadvantages of this approach are: the SPST switch adds loss to the front end decreasing the receiver sensitivity; the receiver cannot receive signals when during transmit phase; the SPST switch adds costs and size to the receiver; and achieving high isolation is difficult and can require multiple switches.

In contrast, the present invention (FIG. 10B) overcomes these limitations by phase modulating the internal calibration signal within the internal calibration loop between 0 and 180 degrees and in the digital receiver performing the same phase modulation to the internal calibration signal. By modulating the phase of the internal calibration loop by 0 and 180 degrees, every other internal calibration signal is multiplied by 1 and then −1. Likewise in the digital receiver the same process is performed which results in the internal calibration signal having no phase modulation. The leakage signal, which is not phase modulated by the internal calibration loop since it does not travel through the internal calibration loop is only phase modulated by the digital receiver. As a result, coming out of the digital receiver every other leakage signal is multiplied by 1 and −1. By coherently averaging two consecutive internal calibration pulses, the leakage signal is cancel. Note in FIG. 10B, the SPST switch in the receiver (dotted lines) may be removed or its high isolation requirements significantly reduced by the additional leakage signal suppression achieve by the present approach. The amount of leakage suppression is only dependent on the phase noise of the transmitter and receiver and the phase stability of the leakage signal from pulse to pulse.

The receive signal can also be recovered by phase modulating the signal coming out of the digital receiver again by 0 and 180 degrees (i.e. multiplying consecutive receive profiles by 1 and −1). In this case the internal calibration signal will be canceled when performing coherent averaging of two adjacent profiles while the receive signal (contains leakage and receive signal from scene) is no longer modulated and thus recovered.

The phase modulation in the digital receiver can be performed only during the presence of the internal calibration signal as well in order not to modulate the receive signal after the internal calibration signal has passed through.

In instances where the transmitter has high phase noise, this approach may still be used. By sending two consecutive signals with inter pulse spacing of nano seconds or microseconds, the internal calibration loop applies 0 deg phase shift to the first pulse and 180 deg phase shift to the second as before. Since the two pulses are separated by very short time, the phase noise effects (integrated phase noise) is significantly reduced compared to that over a pulse repetition interval and high leakage suppression can be achieved.

An alternative configuration is to modulate the internal calibration signal with the switchable attenuator instead of the phase modulator. The internal calibration signal is phase modulated by the receiver by 0 and 180 degrees. Coherently averaging two consecutive internal calibration pulses, the leakage signal is cancel while the internal calibration signal is only reduced by $IC_A$. The advantage of this approach is that switchable attenuator performance compared to phase modulator has wider bandwidth and switchable attenuator cost and size can be less.

The internal calibration module 450 also provides a built-in test for monitoring the health of the overall system in real-time.

The phased-array terrain-interferometer 100 provides high-resolution 2D complex image data including intensity and radial velocity imagery of the forward scene topography when operating with one sub-array 200. However, when configured with two or more sub-arrays 1125 aligned to form a vertical baseline B, as shown in FIG. 11, the phased-array terrain-interferometer 100 can provide unflattened 2D and 3D topographic imagery of the forward scene topography.

The vertical baseline 1105 introduces a path difference Δr between the two sub-arrays 1125. Measuring the phase difference δφ between the two sub-arrays 1125 permits determination of the path difference Δr. The path difference Δr, in turn, provides a basis for determining a height change Δh that corresponds to a height of a feature. The phased-array terrain-interferometer 100 thus provides a way to carry out radar interferometry of terrain that is in front of a moving platform, rather than to the side of the moving platform. Additionally, the phased-array terrain-interferometer 100 employs digital beam forming that provides interferometric measurements of the full field-of-view simultaneously FIG. 11 illustrates the geometry. Two sub-arrays 1125 are deployed forming a vertical baseline, B.

Figure 11:
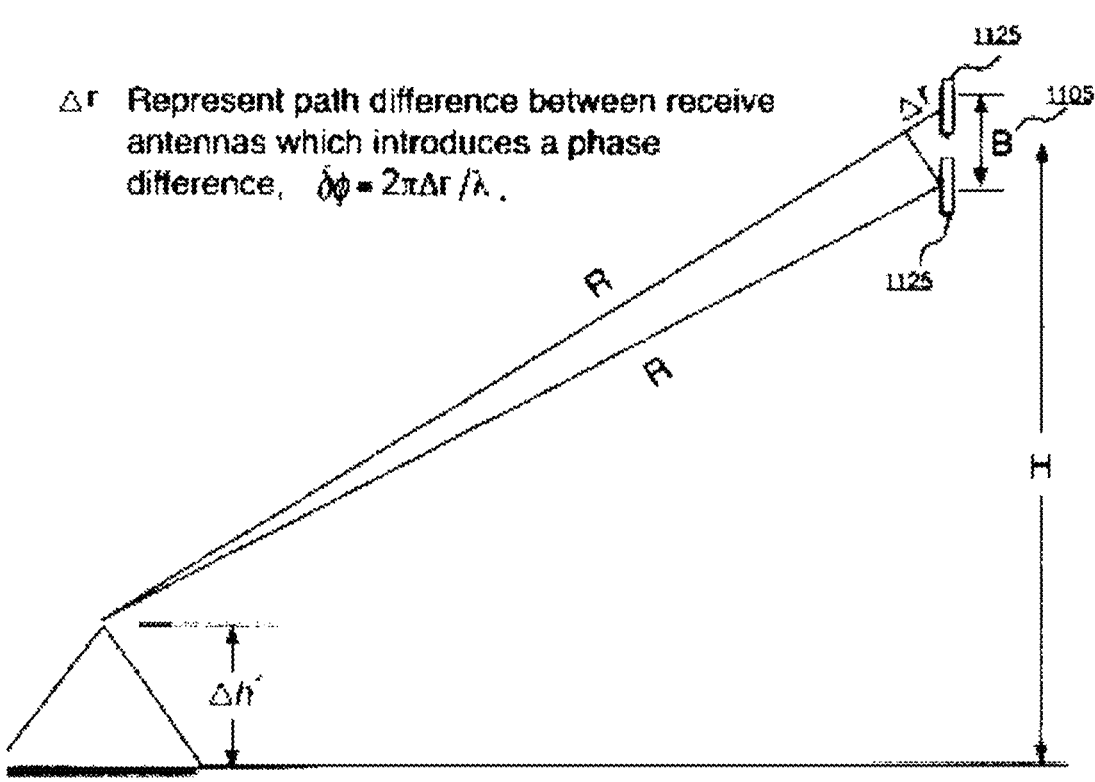
FIG. 11 shows geometry associated with the operation of the phased-array terrain-interferometer.

In FIG. 11, a phased-array terrain-interferometer 100 having two sub arrays 1125 separated along a baseline B images the 3D topography by using single pass interferometry techniques. The two sub-arrays 1125 are displaced from each other but view the same region on the ground to resolve the height of that region. The interferometric combination of data received from the two sub-arrays 1125 allows the path-length difference Δr from the illuminated area to be determined to within a fraction of a wavelength. From the interferometric phase, it is possible to estimate the height of the phase center of a target at a particular pixel. As a result, the phased-array terrain-interferometer 100 provides not only the position of each image point in azimuth and slant range, but also the height of that point through the use of the interferometry. The elevation measurement error Δh is a function of the baseline length, the wave number k, and the radar interferometric phase error, δφ:

$$\Delta h = -\frac{R\sin(\theta)}{kB\cos(\theta - \alpha)}\delta\phi$$

where R is the range, θ is the look angle, and a is the baseline orientation angle, i.e. the angle the a vector between the two antenna phase centers makes with respect to the local horizontal. It is apparent from the phase error term δφ that high frequencies, which would result in larger wavenumbers k, maximize the interferometric accuracy for a given baseline length. Using millimeter-wave band frequencies, such as Ka-band, thus allows high accuracy mapping from a system that fits in a compact volume suitable for airborne sensors.

However, a further consideration constraining the baseline arises because phase measurements are limited to be between 0 and 2π radians, whereas the actual differential range difference can be many multiples of 2π radians. This creates an ambiguity associated with a phase measurement. To resolve this ambiguity, it is necessary to adjust the measured phases by the correct multiple of 2π radians. The procedure for resolving ambiguity, sometimes referred to as "unwrapping," becomes more difficult as the rate of phase change becomes large. This rate of phase change is a function of the baseline length and local slope.

Although the phased-array terrain-interferometer's viewing geometry is quite favorable to avoid challenges unwrapping the interferometric phase, it nevertheless employs an alternate and more robust approach using a reference surface based on digital terrain maps 160.

It is also noted that the sub-array 1125 can be spaced horizontally (not shown), to resolve velocity in different applications.

In the embodiments described herein, the phased-array terrain-interferometer provides interferometric measurements to validate digital terrain maps 160 and to detect hazards not contained within the digital terrain maps 160. In other words, the phased-array terrain-interferometer 100 detects height anomalies relative to the digital terrain maps 160 in the field-of-view. To exploit this, a reference surface interferogram is generated from a pre-existing digital terrain maps 160 database. With such an interferogram available, it becomes possible to directly and robustly estimate the change in height dh of the surface by using a differential phase between the measured and reference interferograms as provided by phased-array terrain-interferometer 100:

$$\delta\varphi_n = \arg(I_R I^*_m)$$

where $I_R$ is the reference interferogram and $I_m$ is the interferogram provided by the phased-array terrain-interferometer 100. Using real-time knowledge of the antennas and aircraft location, the surface Δh is then triangulated relative to the reference height. This process will naturally fit within a synthetic vision system 140 and flight navigation system 150, i.e. a collision avoidance system, as described by FIG. 1.

In embodiments where digital terrain maps are not available, the phased-array terrain-interferometer 100 can be configured with multiple vertical baselines using more than two sub-arrays. This extends the phase wrapping interval as the two or more baselines will have unique solutions over a larger vertical extent. The sub-arrays can also be deployed at different frequencies to create baselines having different electrical lengths while minimizing the vertical baseline.

In some embodiments, the phased-array terrain-interferometer 100 carries out digital beam forming in both the vertical plane and the horizontal plane, also referred to as the "elevation plane" and "azimuth plane" respectively. In this configuration the phased-array terrain-interferometer 100 comprises several sub-arrays 200 forming a continuous aperture. These arrays include horizontal arrays and vertical arrays, both of which can be thinned as indicated by FIG. 6.

In such embodiments, the digital beam former 404 forms beams in both the elevation plane and azimuth planes. The digital beam former 404 can form many different beams using different portions of the vertical array. This produces a phased-array terrain-interferometer 100 with dynamic and multiple baselines. Since this all occurs within the digital beam former 404, the physical baselines and elevation aperture sizes can be optimized based on the mission requirements.

In both configurations, either as multiple sub-arrays or elevation digital beam forming, the phased-array terrain-interferometer 100 can deploy an interferometric Ping-Pong mode that uses multiple transmitting modules 420 in the vertical plane. By alternating the transmit signal or simultaneously transmitting at slightly offset frequencies and receiving with all receiving modules 430, it is possible to double the electrical length of the baseline B. This allows twice the interferometric resolution with the same physical baseline dimension.

While there is shown and described herein certain specific structures embodying various embodiments of the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A mobile radar apparatus comprising:
   a first radar sub-array including at least one transmitter and a plurality of receivers;
   a second radar sub-array including a plurality of receivers;
   each of said sub-arrays being configured to continuously illuminate a topographical area along a directional heading traveled by said mobile radar apparatus, to receive a backscatter profile of said illuminated topographical area and to generate 2D topographic image data of said topographical area,
   each of said sub-arrays being spaced by a predetermined baseline distance B;
   a processor configured to receive respective 2D topographic image data from each of said first and second sub-arrays and apply single-pass interferometric processing to measure a height of the topography at each pixel within said 2D image data,
   said processor being further configured to generate from said 2D topographic image data and said interferometric processing, 3D topographic image data having the position and height of each topographical feature,
   wherein each sub-array includes a digital beam former configured to process said backscatter profiles using a multi-plane digital beam forming process to establish multiple digital beam forming processing planes within each sub-array.

2. The mobile radar apparatus of claim 1 wherein each sub-array is further configured to implement a frequency hopping process in combination with said multi-plane digital beam forming process.

3. The mobile radar apparatus of claim 1 wherein each sub-array is further configured to implement a frequency hopping process with phase modulation for frequency sub channel spectral leakage suppression with said multi-plane digital beam forming process.

4. The mobile radar apparatus of claim 1 wherein each sub-array is further configured to implement a Doppler shift correction using a two-step Doppler corrected digital beam forming process comprising a step of correcting for average Doppler shift and correcting for residual Doppler errors arising from variations in azimuth beam and range gating.

5. The radar apparatus of claim 1 wherein said second radar sub-array includes at least one transmitter and said processor is configured to cause said transmitters of said sub-arrays to alternately transmit pulses or simultaneously transmit pulses at offset frequencies and to receive with all receivers thereby creating an interferometric Ping Pong mode that increases the electric baseline distance.

6. A mobile radar apparatus comprising:
a first radar sub-array including at least one transmitter and a plurality of receivers;
a second radar sub-array including a plurality of receivers;
each of said radar sub-arrays comprising a transmitter gain calibration loop interposed between said transmitter and said receivers,
each of said sub-arrays being configured to continuously illuminate a topographical area along a directional heading traveled by said mobile radar apparatus, to receive a backscatter profile of said illuminated topographical area and to generate 2D topographic image data of said topographical area,
each of said sub-arrays being spaced by a predetermined baseline distance B;
a processor configured to receive respective 2D topographic image data from each of said first and second sub-arrays and apply single-pass interferometric processing to measure a height of the topography at each pixel within said 2D image data,
said processor being further configured to generate from said 2D topographic image data and said interferometric processing, 3D topographic image data having the position and height of each topographical feature,
wherein said calibration loop includes a phase modulator coupled to said transmitter, an attenuator and an N-way divider configured to output a calibration signal to each of said plurality of receivers, wherein said phase modulator is configured to transition between a first state which applies a phase shift of 0 degrees and a second state which applies a phase shift of 180 degrees.

7. The radar apparatus of claim 6 wherein attenuator comprises a switchable attenuator.

8. The radar apparatus of claim 6 wherein said attenuator comprises a fixed attenuator.

9. A mobile radar apparatus comprising:
a first radar sub-array including at least one transmitter and a plurality of receivers;
a second radar sub-array including a plurality of receivers;
each of said radar sub-arrays comprising a transmitter gain calibration loop interposed between said transmitter and said receivers,
each of said sub-arrays being configured to continuously illuminate a topographical area along a directional heading traveled by said mobile radar apparatus, to receive a backscatter profile of said illuminated topographical area and to generate 2D topographic image data of said topographical area,
each of said sub-arrays being spaced by a predetermined baseline distance B;
a processor configured to receive respective 2D topographic image data from each of said first and second sub-arrays and apply single-pass interferometric processing to measure a height of the topography at each pixel within said 2D image data,
said processor being further configured to generate from said 2D topographic image data and said interferometric processing, 3D topographic image data having the position and height of each topographical feature,
wherein said calibration loop includes a switchable attenuator coupled to said transmitter and an N-way divider configured to output a calibration signal to each of said plurality of receivers, wherein said switchable attenuator is configured to transition between a first state which applies low attenuation and a second state which applies a high attenuation.

10. The radar apparatus of claim 9 further comprising a phase modulator coupled to said transmitter.

11. A mobile radar apparatus comprising:
a first radar sub-array including at least one transmitter and a plurality of receivers;
a second radar sub-array including a plurality of receivers;
each of said sub-arrays being configured to continuously illuminate a topographical area along a directional heading traveled by said mobile radar apparatus, to receive a backscatter profile of said illuminated topographical area and to generate 2D topographic image data of said topographical area,
each of said sub-arrays being spaced by a predetermined baseline distance B;
a processor configured to receive respective 2D topographic image data from each of said first and second sub-arrays and apply single-pass interferometric processing to measure a height of the topography at each pixel within said 2D image data,
said processor being further configured to generate from said 2D topographic image data and said interferometric processing, 3D topographic image data having the position and height of each topographical feature; and
a digital terrain map data source storing DTM data,
said processor being further configured to utilize interferometric phase directly in a slant-range plane to compare said 3D topographic image data having the position and height of each topographical feature with said DTM data and to thereby detect height anomalies in the topographic field of view.

* * * * *